(12) United States Patent
Novak

(10) Patent No.: US 12,236,799 B2
(45) Date of Patent: Feb. 25, 2025

(54) PLAYING CARD SCANNER APPARATUS

(71) Applicant: Timothy Novak, Justice, IL (US)

(72) Inventor: Timothy Novak, Justice, IL (US)

( * ) Notice: Subject to any disclaimer, the term of this patent is extended or adjusted under 35 U.S.C. 154(b) by 895 days.

(21) Appl. No.: 17/089,778

(22) Filed: Nov. 5, 2020

(65) Prior Publication Data
US 2022/0139259 A1    May 5, 2022

(51) Int. Cl.
G09B 21/00    (2006.01)
A63F 1/06    (2006.01)
G10L 15/26    (2006.01)
H04N 1/00    (2006.01)
H04R 1/02    (2006.01)

(52) U.S. Cl.
CPC .............. *G09B 21/006* (2013.01); *A63F 1/06* (2013.01); *G10L 15/26* (2013.01); *H04N 1/00557* (2013.01); *H04R 1/028* (2013.01)

(58) Field of Classification Search
CPC .................................................... G09B 21/006
See application file for complete search history.

(56) References Cited

U.S. PATENT DOCUMENTS

| | | | |
|---|---|---|---|
| 5,772,505 A * | 6/1998 | Garczynski | A63F 1/06 273/148 R |
| 6,497,367 B2 | 12/2002 | Conzola | |
| 6,595,857 B2 | 7/2003 | Soltys | |
| 7,769,232 B2 | 8/2010 | Downs | |
| 9,474,957 B2 | 10/2016 | Haushalter | |
| 10,525,330 B1 * | 1/2020 | Ridges | A63F 9/24 |
| 2004/0002387 A1 | 1/2004 | Grady | |
| 2004/0026636 A1 | 2/2004 | Shigeta | |
| 2009/0264200 A1 | 10/2009 | Schwartz | |
| 2014/0377721 A1 | 12/2014 | Reid | |
| 2018/0268648 A1 * | 9/2018 | Shigeta | A63F 1/14 |

FOREIGN PATENT DOCUMENTS

WO    WO2004033056    4/2004

* cited by examiner

Primary Examiner — Kesha Frisby

(57) ABSTRACT

A playing card scanner apparatus for helping the visually impaired play card games includes a housing having a transparent housing top side dimensioned to be larger than a standard playing card. A scanner, a central processing unit (CPU), and a rechargeable battery are coupled within the housing. A charging port is coupled to the housing and is in operational communication with the rechargeable battery. A speaker port is coupled to the housing and is in operational communication with the CPU to receive an earpiece or headphone. A scan button is coupled to the housing to activate the scanner and produce a reading of the number and suit of the standard playing card through the speaker port.

8 Claims, 3 Drawing Sheets

PLAYING CARD SCANNER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to blind assistive devices and more particularly pertains to a new blind assistive device for helping the visually impaired play card games.

(2) Description of Related Art Including Information Disclosed Under 37 CFR 1.97 and 1.98

The prior art relates to blind assistive devices. Known devices can read and verify playing cards in a variety of manners. These devices, however, often require special cards or are integrated into a specific game. Existing devices fail to provide a scanner to read a single playing card and deliver an auditory reading of the card suit and number through an earpiece to a visually impaired player.

BRIEF SUMMARY OF THE INVENTION

An embodiment of the disclosure meets the needs presented above by generally comprising a housing having a housing front side, a housing back side, a housing top side, a housing bottom side, a housing left side, and a housing right side. The housing top side is transparent and dimensioned to be larger than a standard playing card. A scanner is coupled within the housing. A central processing unit (CPU) is coupled within the housing and is in operational communication with the scanner. The CPU is programmed with a text-to-speech software. A rechargeable battery is coupled within the housing. The rechargeable battery is in operational communication with the CPU. A charging port is coupled to the housing and is in operational communication with the rechargeable battery. A speaker port is coupled to the housing and is in operational communication with the CPU. The speaker port is configured to receive an earpiece or headphone. A scan button is coupled to the housing. The scan button is in operational communication with the CPU to activate the scanner and produce a reading of the number and suit of the standard playing card through the speaker port.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
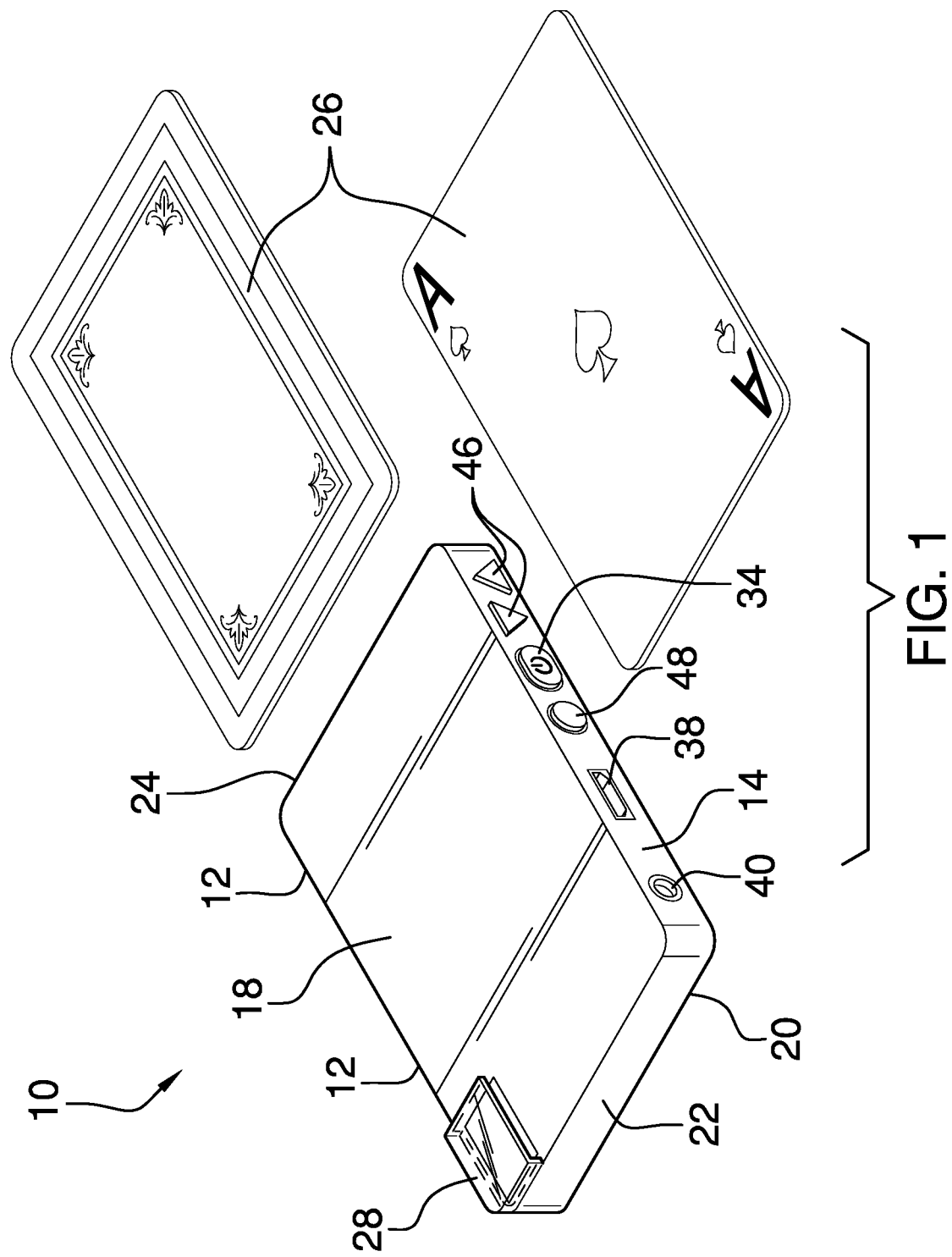
FIG. 1 is an isometric view of a playing card scanner apparatus according to an embodiment of the disclosure.
Figure 2:
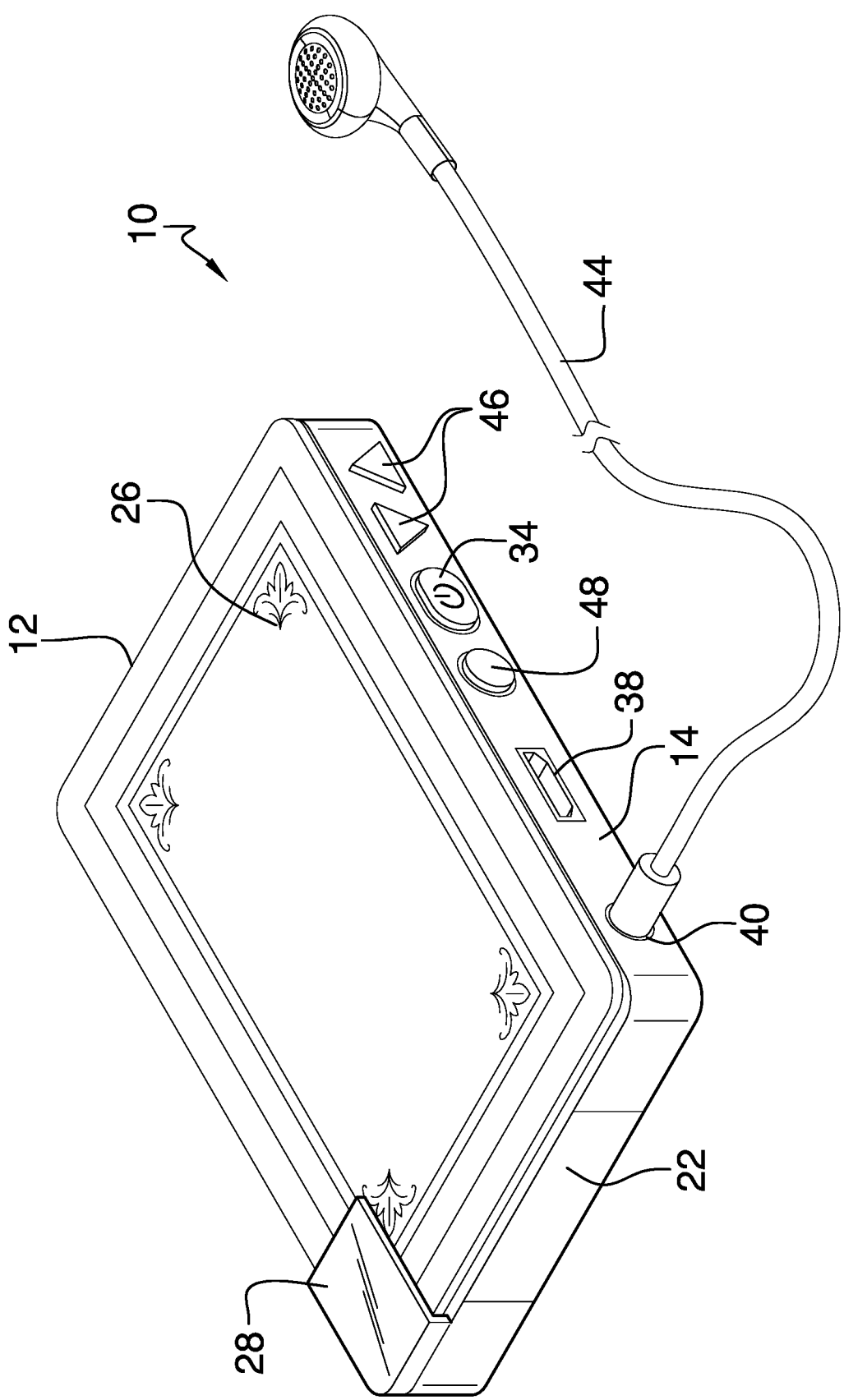
FIG. 2 is an isometric in-use view of an embodiment of the disclosure.
Figure 3:
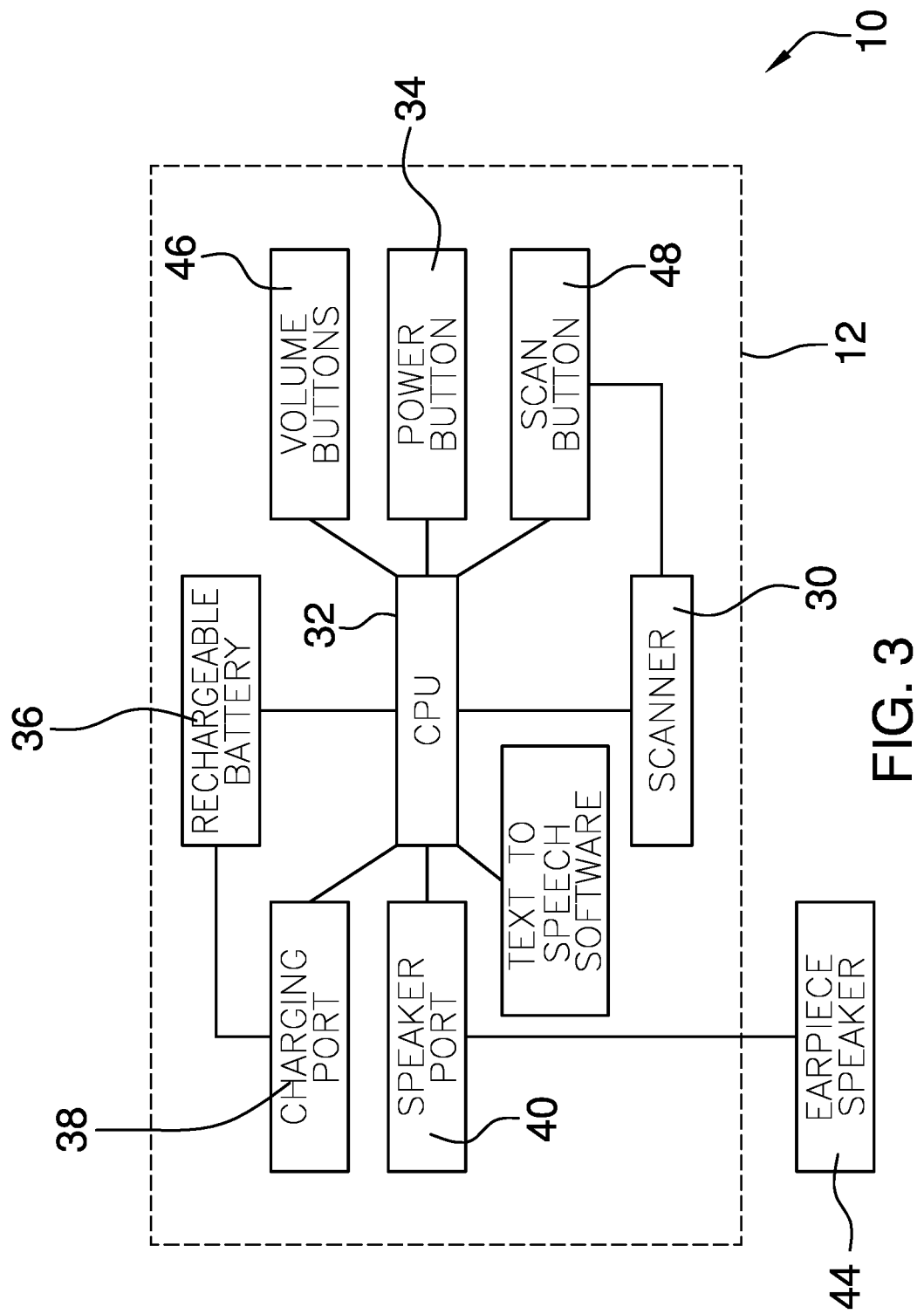
FIG. 3 is a block diagram of an embodiment of the disclosure.

With reference now to the drawings, and in particular to FIGS. 1 through 3 thereof, a new blind assistive device embodying the principles and concepts of an embodiment of the disclosure and generally designated by the reference numeral 10 will be described.

As best illustrated in FIGS. 1 through 3, the playing card scanner apparatus 10 generally comprises a housing 12 having a housing front side 14, a housing back side 16, a housing top side 18, a housing bottom side 20, a housing left side 22, and a housing right side 24. The housing top side 18 is transparent and dimensioned to be larger than a standard playing card 26.

A guide 28 may be coupled to the housing 12. The guide 28 is coupled to a corner 30 of the housing top side 18 and is configured to receive and position the standard playing card 26 centered on the housing top side 18. The guide 28 may be coupled flush with the housing back side 16 and the housing left side 22.

A scanner 30 is coupled within the housing 12 to read the playing card 26 through the housing top side 18. A central processing unit (CPU) 32 is coupled within the housing 12 and is in operational communication with the scanner 30. The CPU 32 is programmed with a text-to-speech software to convert the number and suit of the playing card 26 to auditory information.

A power button 34 is coupled to the housing 12 and is in operational communication with the CPU 32. The power button 34 may be coupled to the housing front side 14. A rechargeable battery 36 is coupled within the housing 12 and is in operational communication with the CPU 32. A charging port 38 is coupled to the housing 12 and is in operational communication with the rechargeable battery 36. The charging port 38 may extend through the housing front side 14 and may receive a standard cable such as a universal serial bus (USB).

A speaker port 40 is coupled to the housing 12 and is in operational communication with the CPU 32. The speaker port 40 may extend through the housing front side 14. The speaker port 40 may be in operational communication with the CPU 32. The speaker port 40 may be configured to receive an earpiece 44 or headphone.

A pair of volume buttons 46 may be coupled to the housing 12. The pair of volume buttons 46 is in operational communication with the CPU 32 to adjust the signal volume delivered to the speaker port 40. Each of the volume buttons 46 may be triangular to indicate its function of increasing or decreasing the volume.

A scan button 48 is coupled to the housing 12. The scan button 48 may be coupled to the housing front side 14 and is in operational communication with the CPU 32. The scan button 48 activates the scanner 30 and produces a reading of the number and suit of the standard playing card 26 through the speaker port 40 to the earpiece 44.

In use, the playing card 26 is positioned face down on the housing top side 18 using the guide 28. The scan button 48 is then depressed for the user to hear the number and suit of the playing card 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A playing card scanner apparatus comprising:
    a housing having a housing front side, a housing back side, a housing top side, a housing bottom side, a housing left side, and a housing right side, the housing top side being transparent and dimensioned to be larger than a standard playing card;
    a scanner coupled within the housing;
    a central processing unit (CPU) coupled within the housing, the CPU being in operational communication with the scanner, the CPU being programmed with a text-to-speech software;
    a rechargeable battery coupled within the housing, the rechargeable battery being in operational communication with the CPU;
    a charging port coupled to the housing, the charging port being in operational communication with the rechargeable battery;
    a speaker port coupled to the housing, the speaker port being in operational communication with the CPU, the speaker port being configured to receive an earpiece or headphone;
    a scan button coupled to the housing, the scan button being in operational communication with the CPU to activate the scanner and produce a reading of the number and suit of the standard playing card through the speaker port; and
    a guide coupled to the housing, the guide having perpendicular outer sides aligned with and being coupled to a corner of the housing top side and being configured to receive and position the standard playing card centered on the housing top side.

2. The playing card scanner apparatus of claim 1 further comprising the guide being coupled flush with the housing back side and the housing left side.

3. The playing card scanner apparatus of claim 1 further comprising the charging port extending through the housing front side; the speaker port extending through the housing front side; and the scan button being coupled to the housing front side.

4. The playing card scanner apparatus of claim 1 further comprising a power button coupled to the housing, the power button being in operational communication with the CPU.

5. The playing card scanner apparatus of claim 4 further comprising the power button being coupled to the housing front side.

6. The playing card scanner apparatus of claim 1 further comprising a pair of volume buttons being coupled to the housing, the pair of volume buttons being in operational communication with the CPU.

7. The playing card scanner apparatus of claim 6 further comprising each of the volume buttons being triangular.

8. A playing card scanner apparatus comprising:
    a housing having a housing front side, a housing back side, a housing top side, a housing bottom side, a housing left side, and a housing right side, the housing top side being transparent and dimensioned to be larger than a standard playing card;
    a scanner coupled within the housing;
    a guide coupled to the housing, the guide having perpendicular outer sides aligned with and being coupled to a corner of the housing top side and being configured to receive and position the standard playing card centered on the housing top side, the guide being coupled flush with the housing back side and the housing left side;
    a CPU coupled within the housing, the CPU being in operational communication with the scanner, the CPU being programmed with a text-to-speech software;
    a power button coupled to the housing, the power button being in operational communication with the CPU, the power button being coupled to the housing front side;
    a rechargeable battery coupled within the housing, the rechargeable battery being in operational communication with the CPU;
    a charging port coupled to the housing, the charging port being in operational communication with the rechargeable battery, the charging port extending through the housing front side;
    a speaker port coupled to the housing, the speaker port extending through the housing front side, the speaker port being in operational communication with the CPU, the speaker port being configured to receive an earpiece or headphone;

a pair of volume buttons being coupled to the housing, the pair of volume buttons being in operational communication with the CPU, each of the volume buttons being triangular; and a scan button coupled to the housing, the scan button being coupled to the housing front side, the scan button being in operational communication with the CPU to activate the scanner and produce a reading of the number and suit of the standard playing card through the speaker port.

* * * * *